United States Patent [19]

McCallum

[11] Patent Number: 4,999,653
[45] Date of Patent: Mar. 12, 1991

[54] VENETIAN BLINDING

[75] Inventor: Robert S. McCallum, Terra Cotta, Canada

[73] Assignee: Delphax Systems, Mississauga, Canada

[21] Appl. No.: 433,238

[22] Filed: Nov. 8, 1989

[51] Int. Cl.⁵ ............................................. G01D 15/06
[52] U.S. Cl. .................................................... 346/159
[58] Field of Search .................. 346/159; 400/119, 126

[56] References Cited

U.S. PATENT DOCUMENTS

4,558,334 12/1985 Fotland .............................. 346/159

Primary Examiner—Donald A. Griffin
Attorney, Agent, or Firm—Rogers & Scott

[57] ABSTRACT

A print cartridge is described for charged particle deposition of latent images on a receptor surface adapted to move longitudinally. The cartridge has driver electrodes extending transversely with respect to the movement of the receptor surface and a dielectric covers the driver electrodes. Finger electrodes on the dielectric extend angularly with respect to the driver electrodes with the dielectric separating the finger and driver electrodes. The finger electrodes define primary and secondary apertures where the driver and finger electrodes intersect for depositing latent images of discrete dots spaced transversely on the receptor surface upon selective activation of the driver and finger electrodes. The apertures in each finger electrode are counted in the direction of motion of the receptor surface and the majority are separated transversely from one another by at least two dot spaces and the second and last apertures are spaced transversely with reference respectively to the first and last-but-one apertures in the same transverse direction.

9 Claims, 5 Drawing Sheets

VENETIAN BLINDING

BACKGROUND OF THE INVENTION

This invention relates to print cartridges for electrostatic printers and more particularly to a print cartridge with improved finger electrodes.

Electrostatic printers receive images in the form of electronically coded information and convert it to an output on a medium such as paper. Typically an electrostatic printer uses a print cartridge with a plurality of discharge sites which can be controlled to place electrostatically charged particles on a charge receiving surface such as a revolving print drum or moving belt to form charged dots which in turn make up a latent image. Typically, the receiving surface is comprised of an electrically conductive substrate coated with a dielectric coating to enable it to hold charged particles generated by the print cartridge.

In the following description, the charge receiving surface will be described for convenience primarily with reference to a drum.

Once the latent image has been formed on the drum, toner is applied to the image and subsequently transferred to the paper and fused at a nip between the receiving surface and a fusing roller. Advantageously, the print drum and fusing roller revolve on axes which subtend an angle of approximately forty-five minutes to aid in fusing the toned image to the paper.

Excess toner is removed from the drum by a scraper and any remaining latent image is then discharged by an erase head before the drum completes a revolution and starts the printing cycle again.

The electrostatic printer offers many advantages including relatively high-speed printing of computer generated images and the flexibility to print additional copies or to select either portrait or landscape images.

One type of print cartridge which has formed the basis for many modern electrostatic printers is described in U.S. Pat. No. 4,155,093 to Fotland et al which issued May 15, 1979. This type of cartridge provides for the generation of charged particles by an electrical gas breakdown in a field between two electrodes separated by a dielectric substrate. Rows of parallel and equally spaced driver electrodes are attached to one side of the substrate and run from one end of the cartridge to the other. Parallel and equally spaced finger electrodes are located on the opposite side of the substrate and extend diagonally across the driver electrodes. The finger electrodes define discharge sites in the form of a matrix of apertures corresponding to the points where driver and finger electrodes cross. An AC voltage may be applied to the electrodes to cause gas breakdown and charged particle production at edge structures associated with the apertures.

An improvement on this cartridge structure is described in U.S. Pat. No. 4,160,257 to Carrish which issued July 3, 1979. This patent teaches the use of a third or screen electrode separated from the finger electrodes by a dielectric layer. The screen electrode and dielectric layer both have a matrix of openings in alignment with the apertures in the finger electrodes. A DC field can be applied to this electrode to provide a lensing action for focusing charged particles generated by the cartridge to produce more precise charged dots on the printing drum.

In the cartridge structure described above, the apertures in the matrix are arranged in a series of diagonal rows coinciding with the finger electrodes. The apertures in each diagonal row are arranged to produce charged dots on a particular segment of the drum. Charged particle production can be initiated at each aperture as needed to place a charge on a corresponding point on the drum as the drum rotates past the aperture. The arrangement of apertures is such that it is possible to place charged dots anywhere within a selected zone on the circumference of the drum as it rotates past the cartridge to build up any selected image.

Electrostatic print cartridges of the type just described are well suited for producing both text and graphics although they do have limitations when producing large filled areas. In particular this type of cartridge tends to produce what has become known as a "Venetian blind effect". This effect has the appearance of striations extending in parallel in the direction of motion of the receptor surface past the cartridge and is pronounced when the surface is a drum. The striations take the form of strips of different intensity and result from variations in the charge deposited by the cartridge on the receptor surface. This can be caused by variations in performance of the cartridge across the active surface of the cartridge but is more noticeable as a result of the use of a flat cartridge with a drum of significant curvature. Such a combination inevitably results in the discharge apertures being further from the drum at the edge of the cartridge than they are at the centre of the cartridge. This results in variations in charge deposited and subsequent variation in toned image.

The Venetian blind effect is also caused by the fact that adjacent apertures deposit charge on the drum sequentially so that the most remote aperture discharges beside the next most remote and so on.

SUMMARY OF THE INVENTION

The invention provides an electrostatic print cartridge for use in placing electrostatically charged dots on a charge receiving surface to build a latent image for subsequent toning. The cartridge includes a rigid spine to prevent the cartridge from bending during construction; a dielectric substrate attached to the spine with driver electrodes arranged in parallel lines between the spine and the dielectric substrate; and finger electrodes arranged on the opposite side of the substrate interesecting the driver electrodes and defining a matrix of apertures aligned with the intersection points of the driver and finger electrodes. The apertures in each finger electrode cover a segment of a complete image and are arranged so that the sequence of creating dots is such that primary dots are laid down separated from one another in each segment and subsequently secondary or intermediate dots are placed in spaces between the primary dots as the segment is filled with dots. The adjacent primary and secondary dots are selected from different parts of the cartridge to mix the dots and give a more even average distribution of charge on the drum to thereby minimize the risk of striations of different intensities in the final toned image.

BRIEF DESCRIPTION OF THE DRAWINGS

The invention will be better understood with reference to the following description and drawings, in which.

DESCRIPTION OF THE PREFERRED EMBODIMENT

Figure 1:
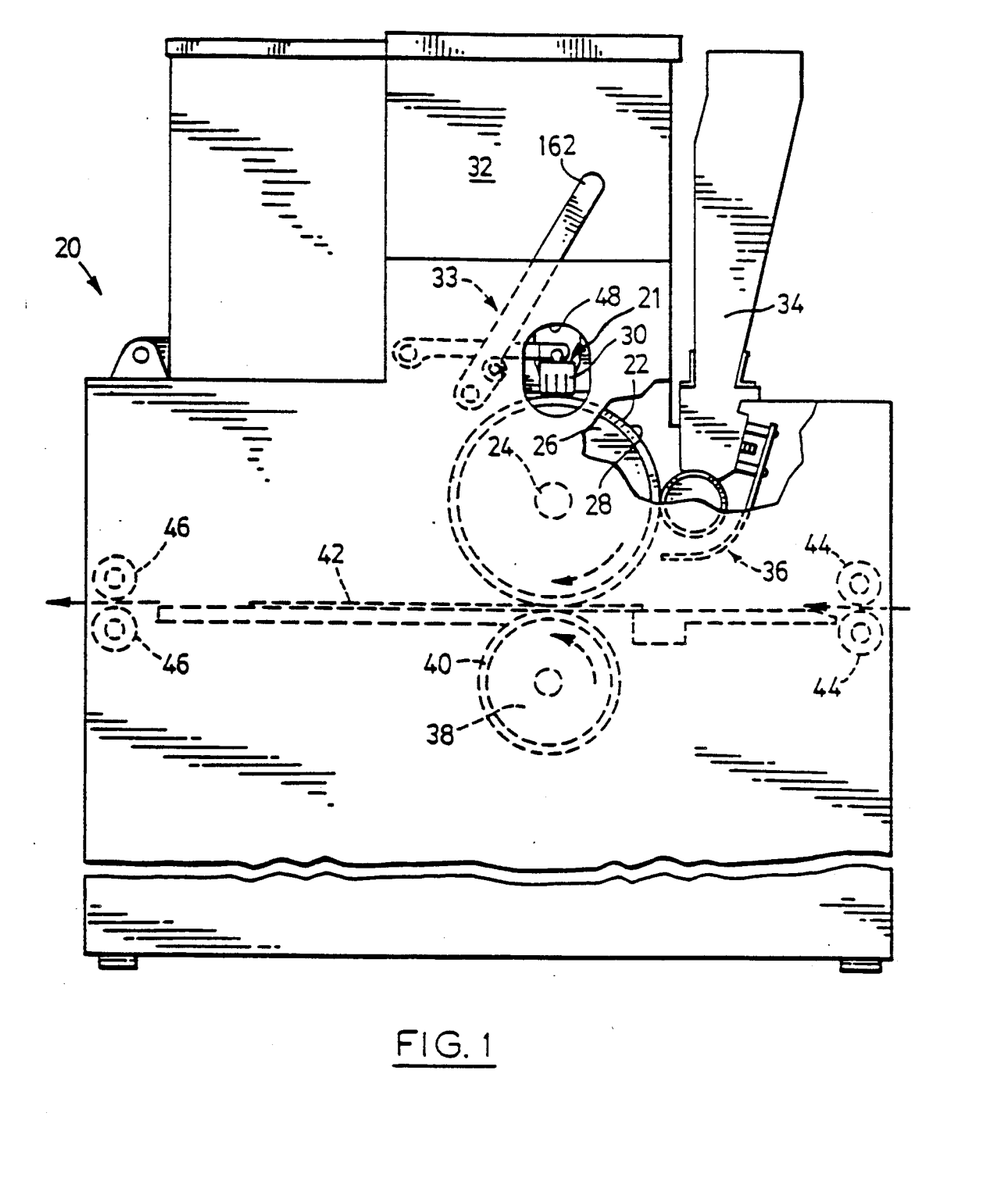
FIG. 1 is a diagrammatic side view of an exemplary printer having an image receptor in the form of a drum and containing a print cartridge according to a preferred embodiment of the invention.

Reference is made first to FIG. 1 which is a somewhat schematic side view of an exemplary printer 20 incorporating a preferred embodiment of cartridge 21 according to the present invention. The invention is particularly useful with this type of printer but could be used with other types of printers having receptor surfaces in the form of belts, etc.

In the exemplary printer, a print drum 22 is mounted for rotation about a shaft 24 and has an electrically conductive core 26 with a dielectric layer 28 capable of receiving a charge image from the print cartridge 21 driven by an electrical control system 32 and held in place by a cartridge mounting assembly 33. As the drum 22 rotates in the direction shown, a latent image is created by the cartridge 21 on the outer surface of the electric layer 28 and comes into contact with toner supplied from a hopper 34 by a feeder mechanism 36. The resulting toned image is carried by the drum 22 towards a nip formed between the drum 22 and a pressure roller 38 having a compliant outer layer 40 positioned in the path of a receptor such as a paper sheet 42 which enters between a pair of feed rollers 44. The pressure in the nip is sufficient to cause the toner to transfer to the paper sheet 42 and, because the axis of the drum 22 and roller 38 lie at an angle of 45 minutes to one another, the combination of pressure and shear causes the toner to be fused to the paper as it is transferred from the drum to the paper. The paper leaves between a pair of output rollers 46.

It is desirable that all operator functions and maintenance be carried out from one side of the printer and for this purpose an access opening 48 is provided in the side of the printer to permit access to the cartridge 21.

Figure 2:
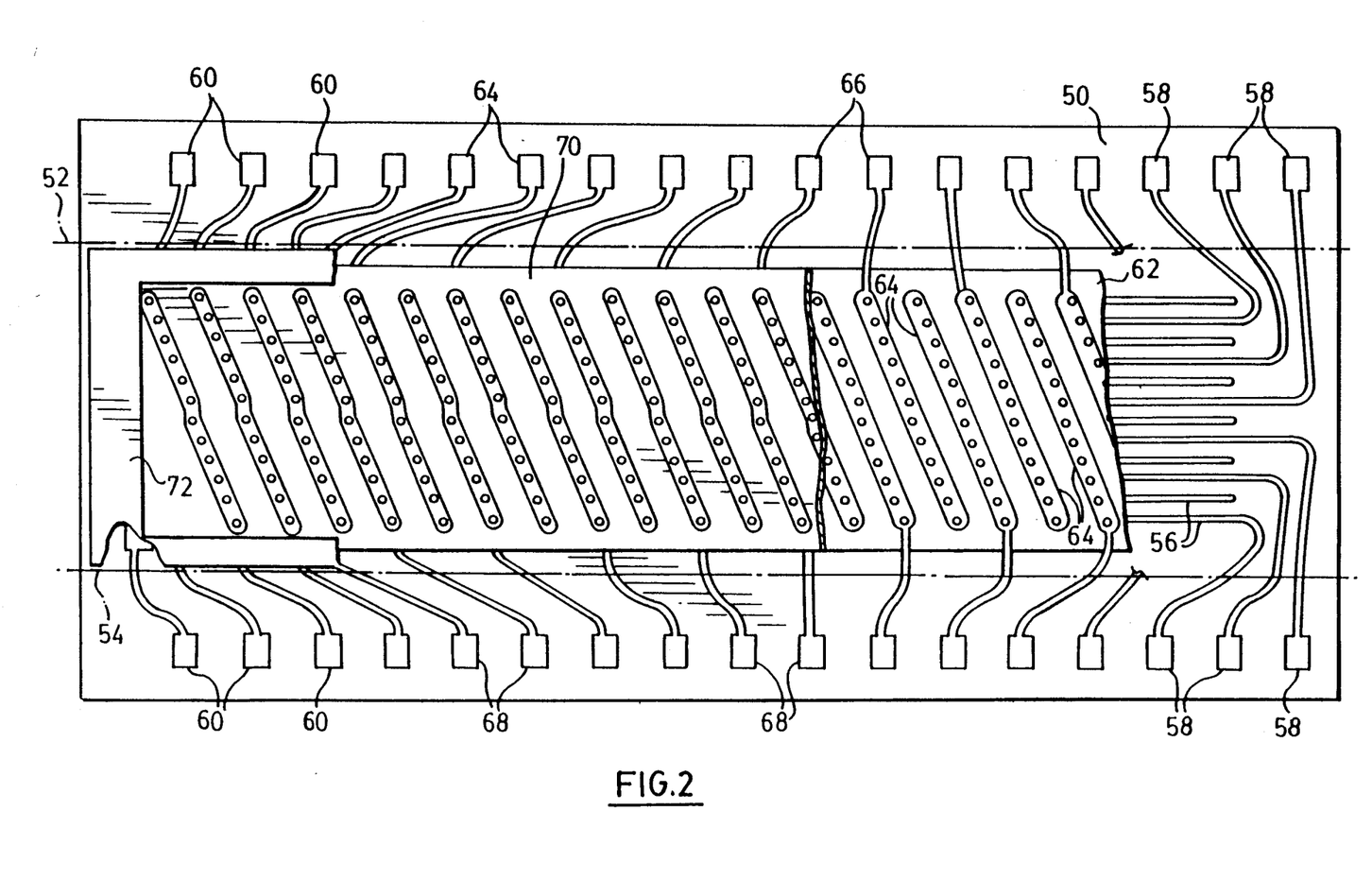
FIG. 2 is a diagrammatic plan view illustrating the cartridge with layers broken away to better show the construction.

Reference is next made to FIG. 2 which illustrates diagrammatically the principle layers of a cartridge, excluding the spine. The view is drawn from the bottom of the cartridge with portions broken away to see the principle layers. In the background is a flexible insulating film 50 which, when it is applied to the spine, is wrapped around the spine by bending generally at the chain-dotted lines 52, 54. The center portion remains exposed below the cartridge while the side portions are wrapped on the sides of the cartridge 21 as seen in FIG. 1.

Working outwardly, the next layer from the insulating film 50 includes driver electrodes 56 which extend longitudinally in parallel and are connected alternately to contacts 58, 60 at opposite ends of the cartridge.

The driver electrodes 56 are covered by a dielectric substrate 62 which separates the electrodes 56 from finger electrodes 64 which are connected alternately to contacts 66, 68 positioned at the sides of the cartridge generally in alignment with the contacts 58, 60. All of the contacts between the contacts 58 and 60 are finger electrode contacts.

Each of the electrodes 64 defines a matrix of apertures extending along the length of the electrode and positioned for deposition of dots as will be described with reference to FIG. 3. For the moment it is sufficient to understand that each of the openings is associated with a cross over point where that particular opening is positioned at a projected junction with a driver electrode 56 so that activation simultaneously of the driver electrode and the finger electrode will result in a discharge at the opening to provide a dot image on a receptor surface such as the drum described with reference to FIG. 1. This method of depositing dots is conventional in this art.

The finger electrodes 64 are covered by a dielectric layer (not shown) and then by a screen electrode 70 which defines a series of slots aligned with the finger electrodes. The screen electrode is used to assist in shaping the dot images created by the cartridge. For the purposes of the present invention it is sufficient to understand that this screen electrode is preferable in the structure and that whatever the shapes of the finger electrodes, slots are provided in the screen electrode and shaped to be in alignment with the apertures in the finger electrodes.

Finally, a protective tape covering 72 of insulating material is positioned over the screen 70 and defines a central opening to expose the working part of the screen.

The geometry of the finger electrodes and associated matrix of apertures will now be explained with reference to FIG. 3 which shows parts of four of the finger electrodes and a pattern of dots resulting from activation of these electrodes in combination with an even number of driver electrodes at positions corresponding to letters A to L. The cartridge is in operation to print a solid line of dots. Each of the finger electrodes is responsible for placing charged dots on a related segment of the drum width and, in this embodiment, each finger electrode has a total of 12 apertures which are identified individually by the letters A through L in combination with numbers 1 to 4 representing the four electrodes in FIG. 3. For instance, A2 represents the aperture at the top left of the drawing.

Figure 3:
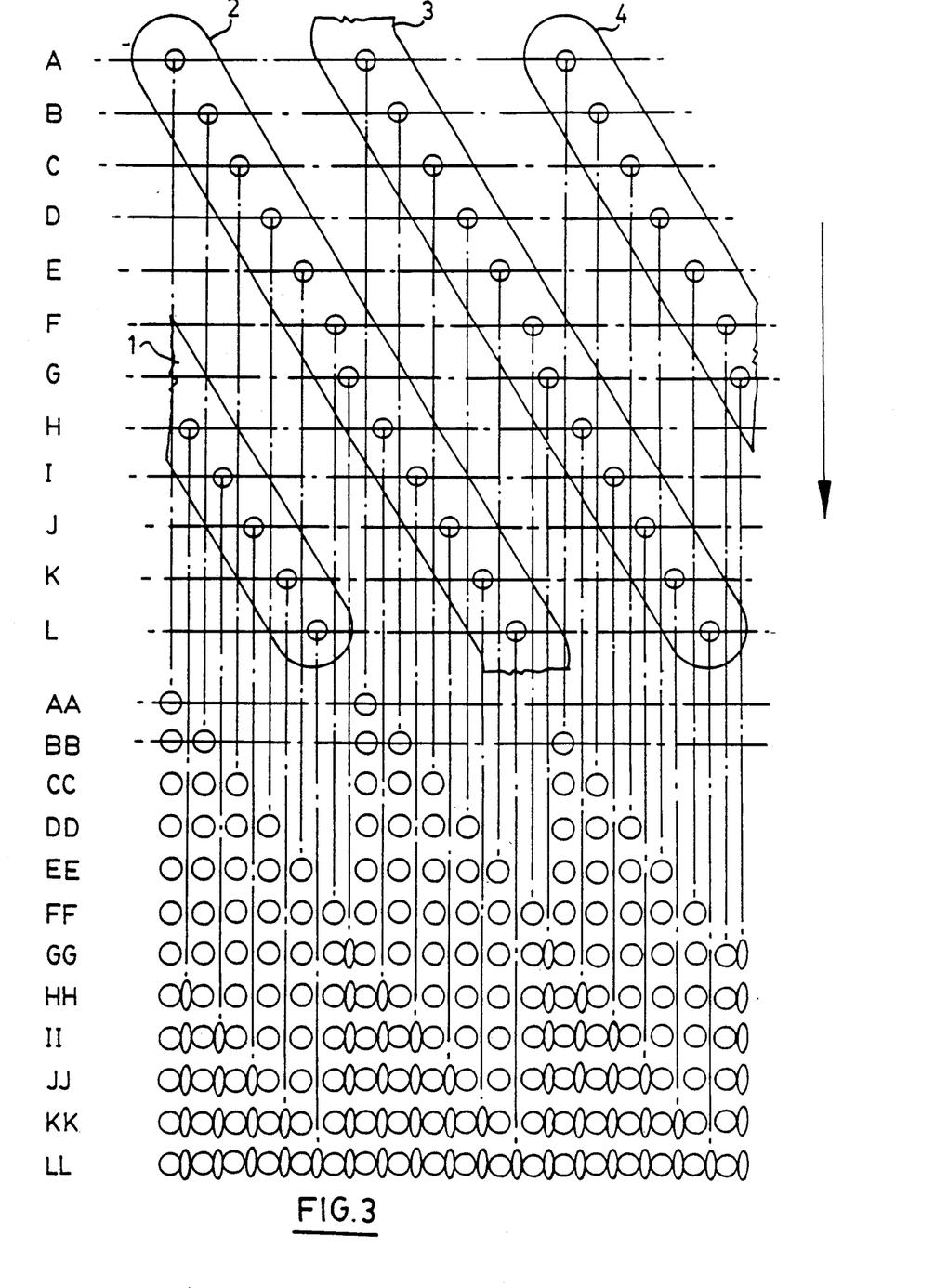
FIG. 3 is a diagrammatic representation of the development of a solid line of dots created from a series of finger and driver electrodes with the finger electrodes arranged according to a preferred embodiment of the invention.

FIG. 3 also illustrates the placement of dots to create a line of solid dots. Initially, the first dot of each segment is placed by activation of apertures such as apertures A2, A3, A4. This is demonstrated at the uppermost line of dots which is indicated by the letters AA. Next, the receptor surface (i.e. the drum) moves longitudinally by an amount equal to the longitudinal spacing between apertures to bring the developing line of dots into alignment with apertures B, and then upon activation, dots are added to dots AA resulting in dots BB.

The positions of the apertures in the finger electrodes will be referenced to adjacent apertures and to the movement of the receptor surface or drum. Distances between apertures in the direction of motion will be longitudinal measurements, and at right angles to the motion they will be transverse measurements. All of the transverse measurements will represent a whole number of dot locations corresponding to positions where dots are to be placed. These dots are spaced transversely by one open dot space. In other words, counting from dot A2, dot B2 is two dot spaces (measured transversely)

away. There is therefore one space between A2 and B2 which will be filled by dot H1.

It will be seen that as the process proceeds, each of the dots laid down up to and including row FF is spaced from an adjacent dot so that there will be minimal electrostatic effect on a newly placed dot by an existing dot. The dots placed so far will be referred to as "primary dots" because each dot is separated from an adjacent, dot and the apertures A2 through F2, along with corresponding apertures in the other electrodes, will be referred to as primary apertures.

The apertures on the electrodes are spaced equally longitudinally and transversely with the exception that the transverse spacing between apertures F and G has been halved when compared with the transverse spacing between the other apertures. Consequently, when apertures G of the electrodes are energized, dots will be positioned between dots created by energizing apertures F and apertures A. This is indicated in the developing row of dots GG where it will be seen that the new dots are squeezed to some extent by the charge in the existing dots previously laid down. Energizing apertures H results in a similar dot deposition in row HH and this continues through to the energizing of apertures L where it will be seen that all of the spaces between the dots and the growing row have been filled so that there is now a continuous line represented by these dots. The dots laid down between the primary dots will be referred to as secondary or intermediate dots and the apertures G2 through L2, and corresponding apertures in the electrodes, as secondary apertures.

There are two results from laying down dots in accordance with the procedure described with reference to FIG. 3. Firstly, because primary dots are laid apart so that they do not affect one another, secondary dots can be laid between pairs of primary dots. Although the secondary dots may be "squeezed" by the repulsive forces between the adjacent dots, the result will be a relatively even line free of significant irregularities or bumps. As mentioned previously, in prior art procedures bumps were caused by repulsion between dots as they were added to a segment of the line so that there was little space for the last dot to be laid sequentially at the end of a segment and immediately adjacent the previously laid first dot of the next segment.

The second result distinguishes this invention. As already mentioned, the dots are laid down as primary and secondary dots. It is also important to note the origins of the dots. As mentioned previously, striations could occur in the prior art toned images because adjacent apertures in an electrode laid adjacent dots on the receptor surface. For instance, in the case of a drum receptor surface the outer apertures (e.g. A2 and L2) are spaced further from the drum than inner apertures (e.g. F2 and G2). This results in smaller dots at the outer apertures and larger dots at the inner apertures. Consequently, if the dots from adjacent apertures are laid in discrete locations adjacent one another, (as was the case in the prior art) the outer dots would give a lighter image compared with a darker area created by the inner dots. The procedure of FIG. 3 alleviates this problem by mixing the dots. For instance outer dot A2 is adjacent inner dot H1, inner dots F2 and G2 are adjacent respective outer dots L1 and A3 etc. This dot mixing therefore minimizes the risk of creating striations in the resulting toned image.

Returning to FIG. 3, it will now be appreciated that the primary dots are laid by apertures A through F of each of the electrodes, and that the remaining apertures G through L lay secondary dots. For convenience, apertures such as A through F will be referred to as primary apertures, and those such as G through L as secondary apertures. Clearly for each pair of primary apertures there has to be a secondary aperture and where apertures start, the first (G) must be spaced transversely from the last primary aperture (F) by one dot space. Consequently, for this electrode configuration there must be an equal number of primary and secondary apertures separated transversely from one another by two dot spaces with the exception that the adjacent ones of the primary and secondary apertures are one dot space apart. This electrode is therefore limited to use with an even number of driver lines.

The arrangement of FIG. 3 can be varied only with respect to the separation between adjacent primary and secondary apertures. The dot spacing between A2, A3, etc. is always equal to the number of driver lines (and is therefore an even number of dot spaces) whereas the spacing between F2 and G2 or F3 and G3 etc. is simply equal to an odd number of dot spaces. Of course in practice the FIG. 3 structure is preferred because if the F and G spacing is large, the electrode becomes larger with a jog in it between sections carrying the primary and secondary apertures and also some "interleaving" of electrodes will result. In this context interleaving means that any line drawn longitudinally (with respect to the movement of the receptor surface) through an aperture in a drawing such as FIG. 3 will pass through more than one electrode. If it passes through two electrodes, there is a 2:1 interleave; three a 3:1 etc.

Figure 4:
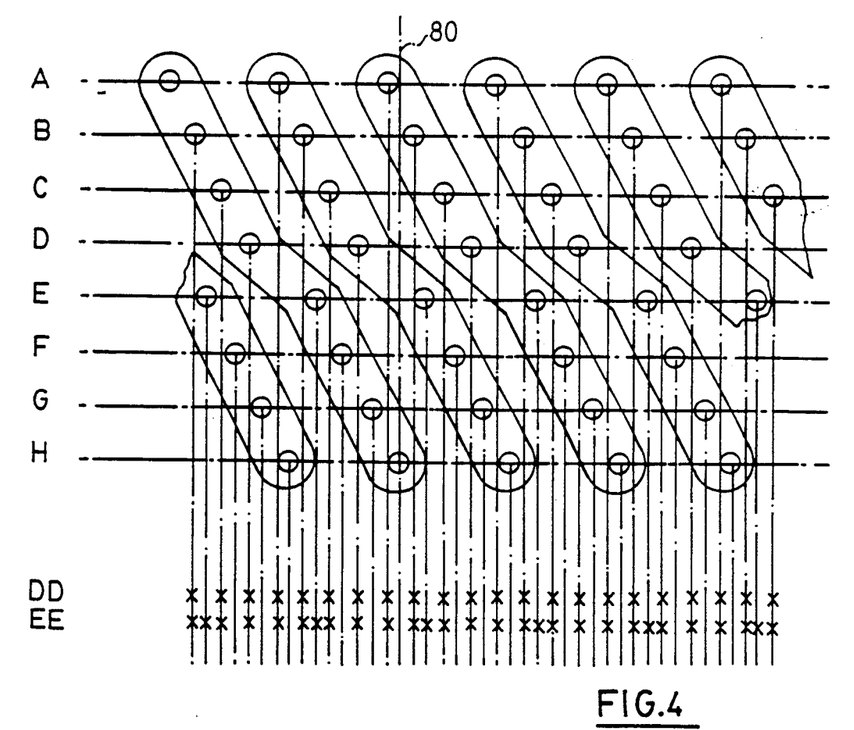
FIGS. 4 to 7 are views similar to parts of FIG. 3 and illustrating a variety of embodiments of finger electrodes and the creation of corresponding lines of dots.

A simple example to illustrate interleaving with a structure like that of FIG. 3 is shown in FIG. 4 for the purposes of illustration. Here it will be seen that the transverse distance between the last of the apertures D and the first of the and secondary apertures E is 5 spaces and there are 8 driver electrodes. There is a 3:1 interleave as demonstrated by ghost line 80.

Figure 5:
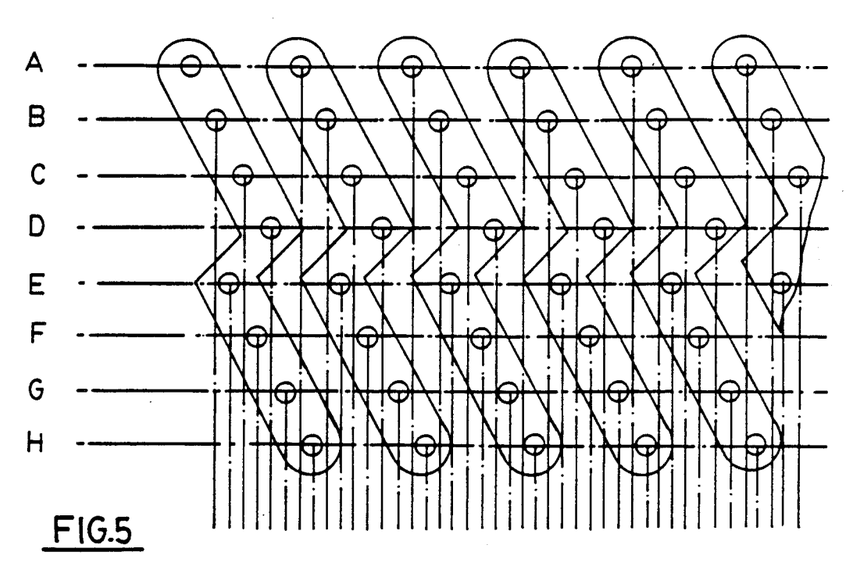

A growing row of dots is illustrated in FIG. 4 at DD where, for the sake of simplified drawing, only the positions of the dots are indicated. This row includes dots made from primary apertures A to D for all of the electrodes. EE illustrates the introduction of the first of the secondary apertures created at opening E and is positioned between dots created by apertures B and C. In other words, because of the increased spacing transversely between the primary dots D and secondary dots E the resulting central dots are not adjacent the other dots made at apertures A. This contrasts with FIG. 3 where central and outer dots are side-by-side. An alternative approach is shown in FIG. 5 which illustrates essentially the same aperture positions but the electrodes are 'Z' shaped. This form of staggering between the primary and secondary apertures of an electrode will require a different driver electrically from that of FIG. 4 but will achieve similar results.

In general, for an even number of drivers, and for the structures exemplified in FIGS. 3, 4 and 5 to operate there are several requirements. Firstly, the transverse dot spacing between corresponding apertures in adjacent electrodes is equal to the number of driver lines; secondly there are an equal number of equally spaced primary apertures and secondary apertures spaced transversely from similar apertures by two dot spaces; thirdly the transverse distance between adjacent of the primary and secondary apertures is equal to an odd number of dot spaces (the optimum for minimizing Venetian blinding being one as in FIG. 3.); and there will be interleaving of electrodes as the odd number increases.

Figure 6:
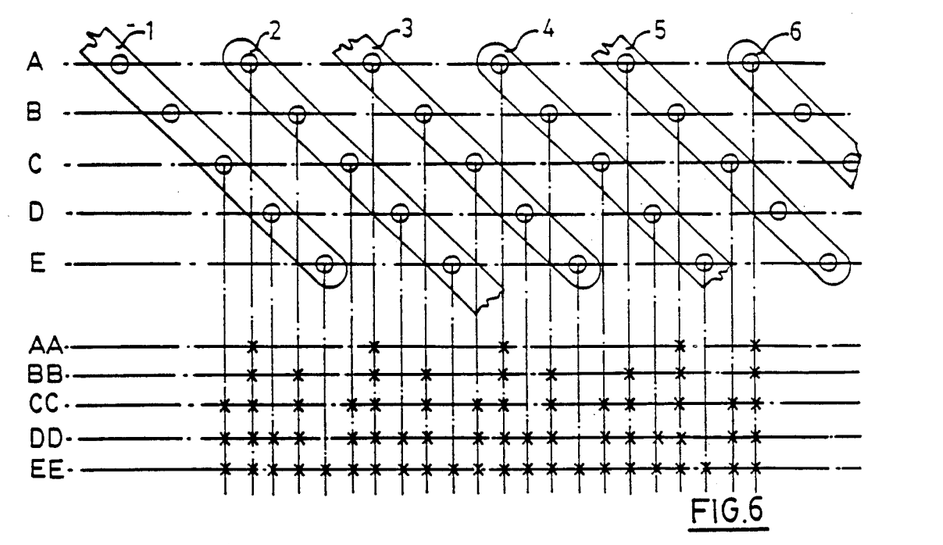

Reference is next made to FIG. 6 which illustrates a different approach to providing finger electrodes which mix the deposition of dots to reduce the risk of striations when there are an odd number of driver electrodes. In the embodiment described with reference to FIG. 3, the arrangement of deposition was such that the secondary dots were placed between primary dots to provide an eventual line made up of alternating larger and smaller dots. This is ideal but improvements over the prior art can be made without going to this extent. As seen in FIG. 6, a series of finger electrodes are essentially conventional but instead of being arranged so that printing takes place segmentally in the line from left to right (or vice versa), each of the finger electrodes is interleaved with adjacent finger electrodes resulting in the laying of dots as shown in FIG. 6. Here it will be seen that (using the same notation as that used in FIG. 3) in the first line dots corresponding to apertures A2, A3, etc. are laid down and then, dots corresponding to apertures B2, etc. are separated from the previously laid dots, and then at the third imaging, apertures C1, C2 etc. provide dots immediately adjacent to dots AA. This will result in some deflection since the dots laid at CC are not balanced between a pair of dots.

Dots DD are placed between dots and then subsequently dots EE are placed between dots. Consequently with the arrangement show in FIG. 6 it is only the dots placed at CC which are positioned immediately adjacent a dot at one side and a space at the other side. Because there is a distribution of dots, i.e. dots AA are beside dot CC and DD, and dots EE are between dots BB and CC, the tendency to create bumps is diminished and more importantly, striations are reduced.

It should be noted in FIG. 6 that there is a 2 to 1 interleaving. The spacing between corresponding apertures Al, and A3, represent a segment in that these apertures correspond without interleaving. Between them is finger electrode 2 which creates the interleaving effect and positions dots between those created by the finger electrodes 1 and 3. It is best to analyze an arrangement of this kind in terms of repetition. Aperture A3 is a repetition of aperture A1, A5 of A3 etc. The dots spacing between repeating dots A1 and A3 is equal to the number of driver lines multiplied by the interleaving factor, in this case 2 to 1. The spacing in this simple example is therefore 10 dot spaces. Put another way, the arrangement consists of primary finger electrodes 1, 3, 5 etc. and interleaved electrodes 2, 4, 6 etc. This is not the same relationship of primary and secondary apertures as there was in FIG. 3. The primary apertures are created by all of the electrodes and all of them take part in the placing of secondary dots. However, there is one distinguishing feature between the primary and secondary finger electrodes. With an interleaving factor of 2 to 1, the spacing between repetitive apertures A1, A3 is an even number of dot spaces and the spacing between corresponding apertures in finger electrode 2 and electrode 1 must be an odd number of dot spaces. Finger electrodes 2, 4, 6 etc. can be placed in any convenient position between the primary electrodes provided of course the spacing between the similar secondary electrodes is also equal to the number of driver lines multiplied by the interleaving factor.

Figure 7:
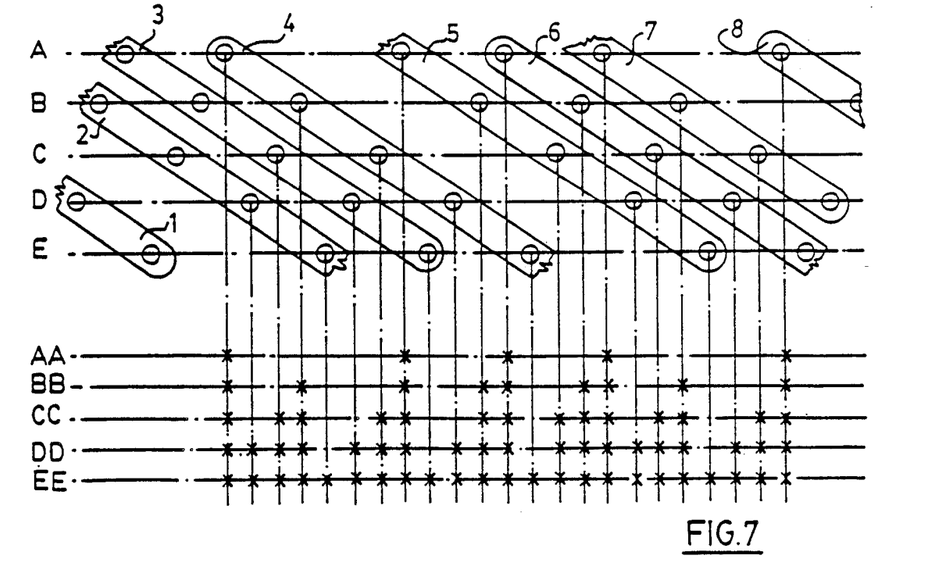

For the purposes of further clarification, FIG. 7 illustrates an interleaving factor of 3 again using 5 drive lines as was the case in FIG. 6. In this case, the primary finger electrodes are 2, 5, 8 etc. The spacing between repeating apertures A1 (not seen) A5, A8 is again equal to the number of driver lines (5) multiplied by the interleave factor (3) making a spacing of 15 dot spaces. The secondary electrodes 3, 4 and 6, 7 etc. are placed between the primary electrodes in any suitable position consistent with filling in the finished line. For instance, electrode 6 is one dot space to the right of primary electrode 5 and electrode 7 is 2 dot spaces to the right. They could be positioned anywhere suitably between electrodes 5 and 8. Again, the spacing between corresponding electrodes will be 15 dot spaces.

The development of the finished line is also shown in FIG. 7 where it will be seen that as dots CC are placed, they are positioned adjacent dots BB without balancing the other side. This will result in some distortion but it is the only condition where a dot is placed where it is not either alone or between two adjacent dots. Also, the dots are positioned so that adjacent apertures in a cartridge do not produce adjacent dot images.

I claim:

1. A print cartridge for charged particle deposition of latent images on a receptor surface adapted to move longitudinally, the cartridge comprising:
   driver electrodes extending transversely with respect to the movement of the receptor surface;
   dielectric means covering the driver electrodes; and
   finger electrodes on the dielectric means extending angularly with respect to the driver electrodes with the dielectric separating the finger and driver electrodes, the finger electrodes defining primary and secondary apertures where the driver and finger electrodes intersect for depositing latent images of discrete dots spaced transversely on the receptor surface upon selective activation of the driver and finger electrodes, the apertures in each finger electrode being counted in the direction of motion of the receptor surface and the majority being separated transversely from one another by at least two dot spaces and the second and last apertures being spaced transversely with reference respectively to the first and last-but-one apertures in the same transverse direction.

2. A print cartridge as claimed in claim 1 in which each of the finger electrodes defines two distinct groups of the apertures, namely a group of said primary apertures and a group of secondary apertures.

3. A print cartridge as claimed in claim 2 in which the spacing transversely between pairs of apertures is equal but for the adjacent one of the primary and secondary apertures.

4. A print cartridge as claimed in claim 2 in which the spacing transversely between pairs of apertures represents the positions of every other dot in a continuous image line, but for the adjacent ones of the primary and secondary apertures which are spaced to represent adjacent dots in said image line.

5. A print cartridge as claimed in claim 1 in which the finger electrodes are interleaved.

6. A print cartridge as claimed in claim 5 in which there are primary finger electrodes and other finger electrodes, and in which similar openings in adjacent pairs of primary finger electrodes are separated transversely by a number of dot spaces equal to the number of driver lines multiplied by the interleave factor.

7. A print cartridge as claimed in claim 1 in which the finger electrodes are interleaved by a factor of two to one.

8. A print cartridge as claimed in claim 1 in which the finger electrodes are interleaved by a factor of three to one.

9. A print cartridge as claimed in claim 1 in which each of the finger electrodes has equal numbers of primary and secondary apertures.

* * * * *